Patented Jan. 19, 1926.

1,570,252

UNITED STATES PATENT OFFICE.

JACOB HOROWITZ, OF BROOKLYN, NEW YORK.

LINSEED-OIL SUBSTITUTE.

No Drawing. Application filed September 18, 1924. Serial No. 738,533.

*To all whom it may concern:*

Be it known that I, JACOB HOROWITZ, a citizen of Austria, residing at New York city, borough of Brooklyn, in the county of Kings and State of New York, have invented certain new and useful Improvements in Linseed-Oil Substitutes, of which the following is a specification.

This invention relates to compositions of matter and has particular reference to fluid compositions used for various commercial and practical purposes.

Among the objects of the invention is to provide a liquid in the nature of an oil that is adapted for use as a substitute for linseed oil and so is adaptable for use in the mixing of paints or the like in which linseed oil is now commonly employed and whereby a commodity may be produced that serves all the usual purposes of linseed oil, even in a superior manner, and yet at a materially reduced cost.

In the specification herewith, while reference is made for the purpose of complying with the statute to certain specific ingredients or component parts and with a suggestion of what I regard as the best proportions thereof, I wish it to be distinctly understood that variations in ingredients and in the proportions thereof may be resorted to under suitable conditions without departing from or sacrificing any of the advantages of the invention as claimed herein.

In the practical operation of this invention I first prepare a gum solution, in the preparation of which I employ a suitable gum such as crude rubber and dissolve the same in a solvent such as a mineral oil preferably kerosene and for this purpose I suggest the use of twenty-five percent of the gum to seventy-five percent by weight of the solvent, applying sufficient heat for the purpose not to exceed probably 170° C.

To a certain quantity of this solution of gum in mineral oil I add a suitable quantity of another component such as ordinary rosin. For this purpose I suggest the solution of one hundred pounds of rosin in one hundred pounds of the first mentioned solution, applying for the purpose of the rosin solution sufficient heat up to probably about 120° C. To this second solution I add a suitable salt continuing and increasing the heat while adding the same and employing sufficient time, about one-half hour or longer according to the various conditions that may be met with. In my experience and practice of this invention I have employed as such salt phosphorus trichloride to the amount of about two percent of the second mentioned solution or four pounds in the illustration given, which among other things serves to remove moisture. The heat may be increased during this step of the process up to about 210° C. The solution is now allowed to cool, and after cooling I reapply moderately heat while a suitable alkali is added for the purpose of insuring a more ready flow of the oil from the brush and to produce a better gloss. For this purpose I use a caustic soda preferably in dry form. The heat is increased or applied up to perhaps 140° C. and sufficient caustic soda is added gradually during this operation to produce an alkali test in the mixture by the use of litmus or other suitable test. This mixture on cooling is of a stable nature and may be used for the purposes already set forth.

I claim:

The herein described linseed oil substitute composed of the following components, in substantially the proportions stated: twenty-five pounds of crude rubber; seventy-five pounds of kerosene solvent; one hundred pounds of rosin; four pounds of phosphorus trichloride, and sufficient caustic soda to produce in the mixture an alkali test.

In testimony whereof I affix my signature.

JACOB HOROWITZ.